(12) United States Patent
Miyazaki (10) Patent No.: US 11,201,552 B2
(45) Date of Patent: Dec. 14, 2021

(54) POWER SUPPLY SYSTEM AND DC/DC CONVERTER

(71) Applicant: SUMIDA CORPORATION, Tokyo (JP)

(72) Inventor: Hiroyuki Miyazaki, Natori (JP)

(73) Assignee: SUMIDA CORPORATION

( * ) Notice: Subject to any disclaimer, the term of this patent is extended or adjusted under 35 U.S.C. 154(b) by 0 days.

(21) Appl. No.: 16/909,293

(22) Filed: Jun. 23, 2020

(65) Prior Publication Data

US 2021/0006169 A1 Jan. 7, 2021

(30) Foreign Application Priority Data

Jul. 4, 2019 (JP) .............................. JP2019-125251

(51) Int. Cl.
*H02M 3/335* (2006.01)
*H02J 7/00* (2006.01)

(52) U.S. Cl.
CPC ....... *H02M 3/33584* (2013.01); *H02J 7/0063* (2013.01)

(58) Field of Classification Search
CPC .......................... H02M 3/33584; H02J 7/0063
See application file for complete search history.

(56) References Cited

U.S. PATENT DOCUMENTS

| | | |
|---|---|---|
| 3,894,280 A | 7/1975 | Bishop et al. |
| 2012/0062038 A1 | 3/2012 | Wang |
| 2013/0044519 A1 | 2/2013 | Teraura et al. |

FOREIGN PATENT DOCUMENTS

JP 2011-234541 A 11/2011

OTHER PUBLICATIONS

J. A. Ferreira et al., "A Self Oscillating Bidirectional DC to DC Converter Employing Minimum Circuitry", IEEE Third International Conference on Power Electronics and Variable-Speed Drives, London, UK, pp. 125-129 (Jan. 1998).
Extended European Search Report for Patent Application No. EP 20182842.3 dated Nov. 20, 2020 (9 pages).

*Primary Examiner* — Carlos Amaya
(74) *Attorney, Agent, or Firm* — Harness, Dickey & Pierce, P.L.C.

(57) ABSTRACT

A power supply system is provided that can synchronize a primary circuit and a secondary circuit with high accuracy and are advantageous in downsizing and simplification. The system includes a first circuit including: a battery device; transistor elements to which a voltage is supplied; coil units to which a feeding current is supplied in an on state of the transistor elements; a capacitor that changes a flow direction of the feeding current; and a driving coil that turns on/off the transistor elements, and a second circuit including: coil units and a driving coil in which induced electromotive force is generated; transistor elements that are turned on/off by the induced electromotive force; and a battery device that receives supply of power in an on state of the transistor elements.

10 Claims, 7 Drawing Sheets

POWER SUPPLY SYSTEM AND DC/DC CONVERTER

CROSS-REFERENCE TO RELATED APPLICATIONS

This application claims the benefit of Japanese Patent Application No. 2019-125251 filed on Jul. 4, 2019 in the Japanese Patent Office, the disclosure of which is herein incorporated in its entirety by reference.

BACKGROUND

Technical Filed

The present invention relates to a power supply system and a DC/DC converter.

Related Art

A bidirectional converter is known as a power conversion apparatus capable of singly performing both charge and discharge. Examples of such a bidirectional converter include a bidirectional DC/DC converter described in Japanese Laid-open patent publication No. 2011-234541. This DC/DC converter includes a primary circuit, a transformer, and a secondary circuit. Each of the primary circuit and the secondary circuit includes four reverse-conducting semiconductor switches forming a full bridge. Turn-on/off of those four semiconductor switches is controlled by a control circuit. The control circuit gives gate control signals having phases synchronous with each other to semiconductor switches that are placed diagonally opposite to each other in the four semiconductor switches. Further, the control circuit controls the semiconductor switches in such a manner that the maximum on-duty ratio of a gate control signal in one period is 50% and a control signal that turns on adjacently-connected semiconductor switches at the same time is not given, to prevent a short circuit between gate electrodes.

However, in the DC/DC converter described in Japanese Laid-open patent publication No. 2011-234541, the above-described control circuit is provided in each of the primary circuit and the secondary circuit and controls the semiconductor switches to synchronize them with each other. The control circuit, which exerts the above-described control with high accuracy, requires a large circuit configuration. This is disadvantageous in singly managing both of charge and discharge of a battery to downsize an apparatus as a whole and simplify its configuration.

The present invention has been devised in view of the above-described matters, and relates to a power supply system and a DC/DC converter that can synchronize a primary circuit and a secondary circuit with high accuracy and are advantageous in downsizing and simplification.

SUMMARY

According to the present invention, there is provided a power supply system comprising: a first circuit; and a second circuit, wherein the first circuit includes: a first battery device in which power is stored; a first switching element configured to receive supply of a voltage from the first battery device; a first feed coil to which a feeding current is supplied from the first battery device in an on state of the first switching element; a changing element configured to change a flow direction of the feeding current flowing through the first feed coil; and a first driving coil configured to turn on/off the first switching element in accordance with the flow direction of the feeding current, and the second circuit includes; a second feed coil and a second driving coil in which induced electromotive force is generated by the feeding current flowing through the first feed coil; a second switching element configured to be turned on/off by the induced electromotive force generated in the second driving coil; and a load configured to receive supply of power from the second feed coil in an on state of the second switching element.

In addition, according to the present invention, there is provided a bidirectional DC/DC converter comprising: a first circuit; and a second circuit, wherein the first circuit includes: a first direct-current battery device in which power is stored; two first switching elements configured to receive supply of a voltage from the first battery device; two first feed coils to which a feeding current is supplied from the first battery device in an on state of the first switching elements; a changing element configured to change a flow direction of the feeding current flowing through the first feed coils; and a first driving coil configured to turn on/off the first switching elements in accordance with the flow direction of the feeding current, and the second circuit includes: two second feed coils and two second driving coils in which induced electromotive force is generated by the feeding current flowing through the first feed coils; two second switching elements configured to be alternately turned on/off by the induced electromotive force generated in the second driving coils, and a second direct-current battery device configured to receive supply of power from the second feed coils in an on state of the second switching elements.

The present invention can provide a power supply system and a DC/DC converter that can synchronize a primary circuit and a secondary circuit with high accuracy and are advantageous in downsizing and simplification.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION

The invention will be now described herein with reference to illustrative embodiments. Those skilled in the art will recognize that many alternative embodiments can be accomplished using the teachings of the present invention and that the invention is not limited to the embodiments illustrated for explanatory purposed.

Below, a power supply system according to one embodiment of the present invention will be described. This embodiment shows an example of a configuration of the present invention to describe technical ideas of the present invention, and does not limit its specific configuration to the shown example. Meanwhile, in the drawings referred to in the embodiment, similar components are denoted by similar reference signs and a part of the description of such components will not be repeated. In particular, among currents illustrated in FIGS. 2 to 5, currents flowing through the same node in a circuit are denoted by the same reference signs. However, the same reference signs denoting currents are not meant to indicate that the currents flow in the same direction.

Figure 1:
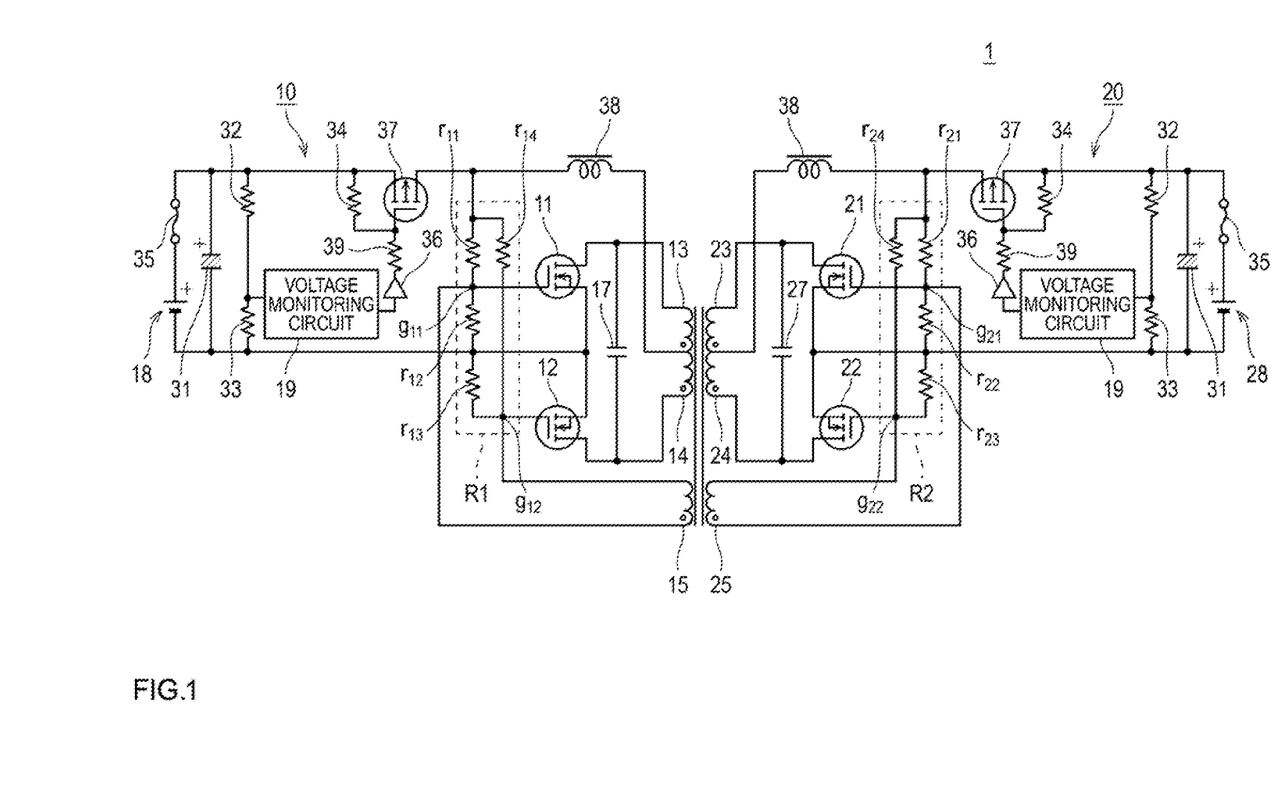
FIG. 1 illustrates an example in which a power supply system according to one embodiment of the present invention is formed as a DC/DC converter.

FIG. 1 is a circuit diagram for explaining a power supply system 1 according to the embodiment. The power supply system 1 includes a first circuit 10 on a primary side and a second circuit 20 on a secondary side. The first circuit 10 and the second circuit 20, each of which includes a battery device, supply power to the battery devices of each other. Note that this embodiment describes an example in which each of battery devices 18 and 28 of the power supply system 1 is a direct-current battery device and the power supply system 1 is formed as a bidirectional DC/DC converter.

In the power supply system 1, when the battery device of one of the first circuit 10 and the second circuit 20 is at a voltage equal to or lower than a predetermined voltage set in advance, the battery device of the other of the circuits charges the battery device at a voltage equal to or lower than the predetermined voltage in a self-excited manner.

First Circuit

Out of the above-mentioned components, the first circuit will be described, first.

As illustrated in FIG. 1, the power supply system 1 includes the first circuit 10 and the second circuit 20. The first circuit 10 and the second circuit 20 are completely insulated from each other and are configured so as to give and receive power to and from each other through electromagnetic induction. The first circuit 10 includes a battery device 18 that is a first battery device in which power is stored, transistor elements 11 and 12 that form a first switching element configured to receive supply of a voltage from the battery device 18, coil units 13 and 14 forming a first feed coil to which a feeding current is supplied from the battery device 18 in an on state of the transistor elements 11 and 12, a capacitor 17 that is a changing element configured to change a flow direction of a feeding current flowing through the coil units 13 and 14, and a driving coil 15 that is a first driving coil configured to turn on/off the transistor elements 11 and 12 in accordance with the flow direction of the feeding current.

Each of the transistor elements 11 and 12 configured to receive supply of a voltage from the battery device 18 constantly receives supply of a voltage equal to or lower than a threshold voltage value from the battery device 18 and also receives supply of a driving voltage from the driving coil 15 that receives supply of power from the battery device 18. Thus, the transistor elements 11 and 12 cannot be turned on when a charging voltage of the battery device 18 is lowered. In this embodiment with such configuration, there is no need to monitor a charging voltage of the battery device 18 and oscillation of the transistor elements 11 and 12 can be started or stopped by a charging voltage.

In at least the first circuit 10, the first switching element is provided in the form of a transistor pair including two transistor elements 11 and 12. Each of the transistor elements 11 and 12 illustrated in FIG. 1 is a field effect transistor (FET) and the capacitor 17 is provided between respective sources of the transistor elements 11 and 12. Meanwhile, the coil units 13 and 14 are two coil units corresponding to the transistor elements 11 and 12, respectively, and form a coil pair. In this regard, the terms "corresponding to" mean that a current flows through the coil unit 13 in an on state of the transistor element 11 while a current flows through the coil unit 14 in an on state of the transistor element 12.

Further, the first circuit 10 performs switching in such a manner that a feeding current is supplied alternately to the two coil units 13 and 14 included in the coil pair through the capacitor 17. The capacitor 17 in the embodiment is charged and discharged between the sources of the transistor elements 11 and 12, by which a feeding current is supplied alternately to the coil units 13 and 14. Timings of power-feed switching between the coil units 13 and 14 match with timings of turn-on/off the transistor elements 11 and 12. Thus, the driving frequency of the first circuit 10 is determined by capacitance of the capacitor 17, a turns ratio between coil units 23 and 24 that are included in the second circuit 20 and form a transformer together with the coil unit 13 and 14, inductance of the coil units 23 and 24, and capacitance of a capacitor 27.

As described above, the power supply system 1 of the embodiment, which rectifies using a transistor element, can operate by application of a voltage equal to or higher than a threshold voltage enough to turn on a transistor, to a gate terminal of the transistor. In most cases, a threshold voltage of a transistor is lower than a diode forward voltage. For this reason, the embodiment can be regarded as being more advantageous in power saving and as providing higher operating efficiency than a circuit having a configuration using a diode for rectification.

Gate terminals of the transistor elements 11 and 12 are connected to a resistor group R1 including resistance elements $r_{11}$, $r_{12}$, $r_{13}$, and $r_{14}$. Values of the resistance elements $r_{11}$, $r_{12}$, $r_{13}$, and $r_{14}$ are set such that a voltage relatively close to a threshold voltage of the transistor elements 11 and 12 is applied to the transistor elements 11 and 12.

Each of the transistor elements 11 and 12 is connected to the resistor group R1. Nonetheless, at a starting time of oscillation, one of the transistor elements 11 and 12 is turned on earlier than the other because of variations in characteristics caused in manufacture of the transistor elements 11 and 12. After one of the transistor elements 11 and 12 is turned on, the transistor elements 11 and 12 are alternately turned on/off by the driving coil 15. Such operations allow the transistor elements 11 and 12 to keep oscillating until a voltage value generated in the resistor group R1 becomes equal to or lower than a threshold voltage.

The driving coil 15 has both ends connected to a node $g_{11}$ and a node $g_{12}$, and the nodes $g_{11}$ and $g_{12}$ are connected to the gate terminals of the transistor elements 11 and 12. Because of this configuration, a voltage that is equal in value to, and is opposite in phase to, a voltage applied to turn on the transistor element 11 or the transistor element 12 is applied to the driving coil 15, so that a driving current flows. In this regard, the terms "equal voltage values" cover a case in which the gate terminals of the transistor elements 11 and 12 and the driving coil 15, which are connected to the nodes $g_{11}$ and $g_{12}$ of the same resistor group R1, are at substantially equal voltages, and the terms allow differences associated with wire lengths or element characteristics.

Both ends of the driving coil 15 are connected to the nodes $g_{11}$ and $g_{12}$. A path for a current flowing through the resistor group R1 is changed in accordance with a change between a charging period and a discharging period of the capacitor 17. While a voltage higher than a threshold voltage is applied to the node $g_{11}$, a voltage lower than the threshold voltage is applied to the node $g_{12}$. This allows a driving voltage higher than a threshold voltage and a driving voltage lower than the threshold voltage to be alternately applied to the nodes $g_{11}$ and $g_{12}$, so that the transistor elements 11 and 12 can be alternately turned on/off in the embodiment.

Further, in the embodiment, a switching period of a driving voltage applied to the nodes $g_{11}$ and $g_{12}$ matches with a period of charge or discharge of the capacitor 17. This makes it possible to turn on the transistor element 11 during flow of a feeding current through the coil unit 13 and turn on the transistor element 12 during flow of a feeding current through the coil unit 14, thereby oscillating both of the transistor elements 11 and 12.

In the driving coil 15, a current flowing through the coil unit 13 flows when a voltage higher than a threshold voltage is applied to the node $g_{11}$ and the transistor element 11 is turned on. Meanwhile, in the driving coil 15, a current flowing through the coil unit 14 flows when a voltage higher than a threshold voltage is applied to the node $g_{12}$ and the transistor element 12 is turned on. In other words, respective currents flowing through the coil units 13 and 14 are alternately supplied as a driving current to the driving coil 15. Combination of those alternate driving currents forms a pulsating current having amplitude that is switched between positive and negative with respect to a center being a threshold voltage of the transistor elements 11 and 12.

The first circuit 10 further includes a voltage monitoring circuit 19 that is a voltage detector configured to detect a voltage value of the battery device 18, and a battery disconnecting circuit configured to disconnect the battery device 18 from the first circuit 10 when a voltage value detected by the voltage monitoring circuit 19 is higher than a predetermined value. In the example illustrated in FIG. 1, a driving circuit 36, resistance elements 39 and 34, and a transistor element 37 that are connected to an output of the voltage monitoring circuit 19 form the battery disconnecting circuit. The voltage monitoring circuit 19 monitors a voltage across resistance elements 32 and 33 that produce a potential difference corresponding to a voltage of the battery device 18, for example. Then, when the monitored voltage is equal to or higher than a predetermined voltage, a gate voltage is applied to the transistor element 37. In the example illustrated in FIG. 1, the transistor element 37 is designed so as to serve as a P-type MOS transistor and be turned off by application of a gate voltage.

Turning off the transistor element 37 disconnects the battery device 18 from the first circuit 10. This configuration prevents the power supply system 1 from being affected by abnormality in the battery device 18 if it occurs, thereby protecting the power supply system 1.

Additionally, the above-described voltage monitoring circuit 19 may be provided in either both of the first circuit 10 and the second circuit 20 or one of the first and second circuits 10 and 20 in which overcharge of the battery device is more likely to occur.

Further, the voltage detector and the battery disconnecting circuit are not limited to the components illustrated in FIG. 1. Any component that can detect abnormality in the battery device 18 and electrically disconnect the battery device 18 from the first circuit 10 can be used.

The first circuit 10 includes a fuse 35, an electrolytic capacitor 31, and a coil 38, in addition to the above-described components. The fuse 35 melts in a case of generation of an excessive current due to abnormality in a self-excited oscillator circuit of the first circuit 10 to disconnect the battery device 18 from the first circuit, thereby preventing the battery device 18 from being heated to a higher temperature. The electrolytic capacitor 31 absorbs a voltage change associated with charge and discharge of the battery device 18. The coil 38 regulates a reactance component of the first circuit 10.

Second Circuit

The second circuit 20 includes coil units 23 and 24 that form a second feed coil, and a driving coil 25 that is a second driving coil. In the coil units 23 and 24 and the driving coil 25, induced electromotive force is generated by a feeding current flowing through the coil units 13 and 14. The second circuit 20 further includes transistor elements 21 and 22 that form a second switching element configured to be turned on/off by the induced electromotive force generated in the driving coil 25, and a load configured to receive supply of power from the coil units 23 and 24 in an on state of the transistor elements 21 and 22. In this embodiment, as the power supply system 1 is formed as a DC/DC converter, the load serves as the battery device 28 that is a second battery device.

Moreover, the second circuit 20 of this embodiment, like the first circuit, includes the capacitor 27 configured to supply a feeding current alternately to the coil units 23 and 24, and a resistor group R2 including resistance elements $r_{21}$ to $r_{24}$.

Because of the above-described configuration, in feeding power from the first circuit 10 to the second circuit 20, for example, a feeding current flows through the coil unit 13, to generate induced electromotive force in the coil unit 23. During the flow of the feeding current through the coil unit 13, the transistor element 11 is turned on and the transistor element 12 is turned off. At that time, a current synchronous with the current flowing through the coil unit 13 is supplied as a driving current to the driving coil 15. Then, an induced current synchronous with the current flowing through the coil unit 13 is generated also in the driving coil 25.

Flow of the induced current turns on a gate terminal of the transistor element 21. At that time, there is formed a path for a current that passes through the coil unit 23, the coil 38, the fuse 35, and the battery device 28 and returns to the coil unit 23. As a result of formation of the path for current, induced electromotive force generated in the coil unit 23 is stored in the battery device 28.

Subsequently, a feeding current flows through the coil unit 14, to generate induced electromotive force in the driving coil 25. Then, the transistor element 21 is turned off and the transistor element 22 is turned on. Turning on the transistor element 22 forms a path for current that passes through the coil unit 24, the coil 38, the fuse 35, and the battery device 28 and returns to the coil unit 24. As a result of formation of the path for current, induced electromotive force generated in the coil unit 24 is stored in the battery device 28.

In this embodiment, a feeding current is supplied alternately to the coil units 13 and 14, so that induced electromotive force is generated alternately in the coil units 23 and 24. Then, the driving coils 15 and 25 drive the transistor elements 21 and 22 to form a path for an induced current near the second circuit 20, thereby charging the battery device 28 with the generated induced electromotive force.

The second circuit 20 further includes nodes g21 and g22 that form a power supply node configured to supply power for the battery device 28 to a gate terminal to which power for turning on the transistor elements 21 and 22 is supplied. This configuration allows a voltage to be supplied from the battery device 28 to the transistor elements 21 and 22 after the voltage of the battery device 28 reaches a predetermined voltage in the second circuit 20. According to the above-described embodiment, in a case where the battery device 18 of the first circuit 10 is at a voltage equal to or lower than a predetermined voltage, a voltage stored in the battery device 28 can be supplied to the battery device 18. Additionally, though a power supply node is connected to a gate terminal of a transistor element and applies a voltage thereto in the example illustrated in FIG. 1, the power supply node may supply either a voltage or a current for turning on a transistor element. A voltage or a current is appropriately selected depending on the configuration of a transistor element.

Below, those operations will be described in detail step by step.

Figure 2:
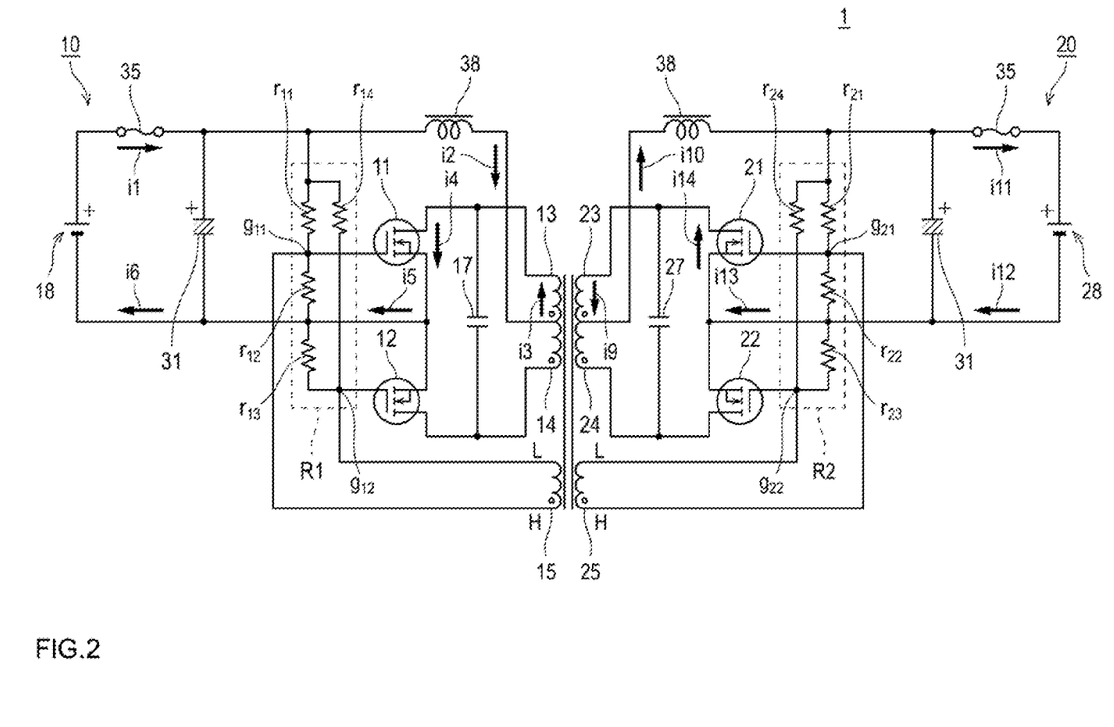
FIG. 2 is a diagram for explaining operations of the power supply system in feeding power from a first circuit to a second circuit.
Figure 3:
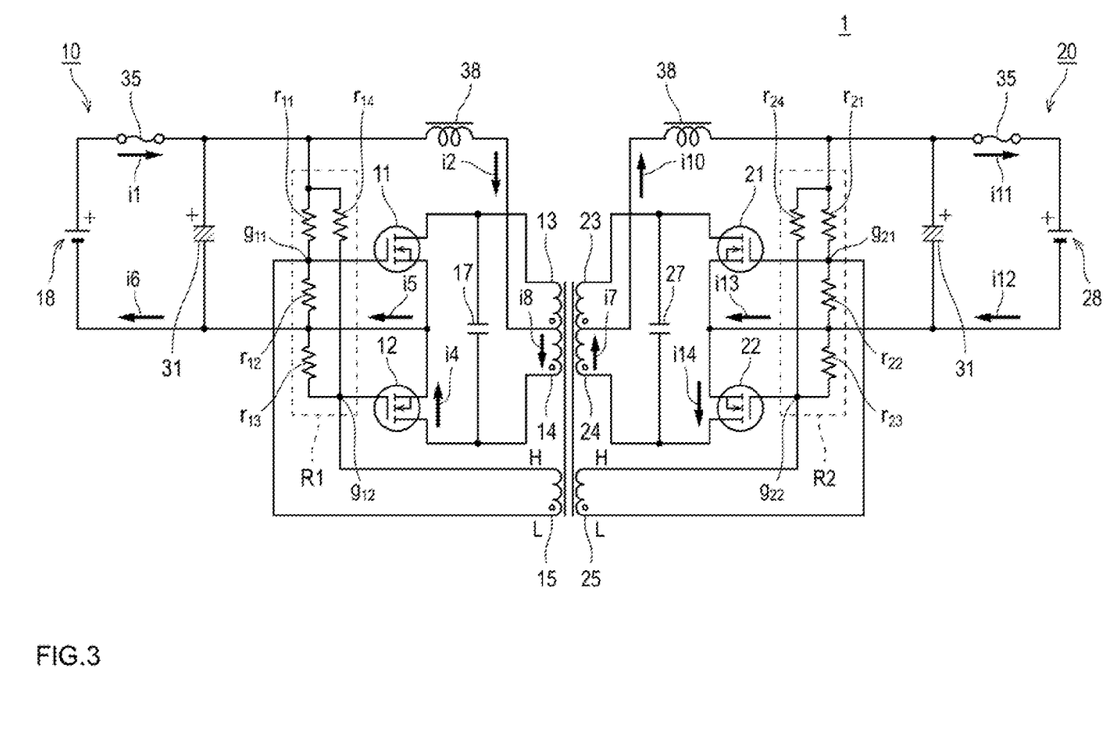
FIG. 3 is a diagram for explaining operations of the power supply system in feeding power from a first circuit to a second circuit.
Figure 4:
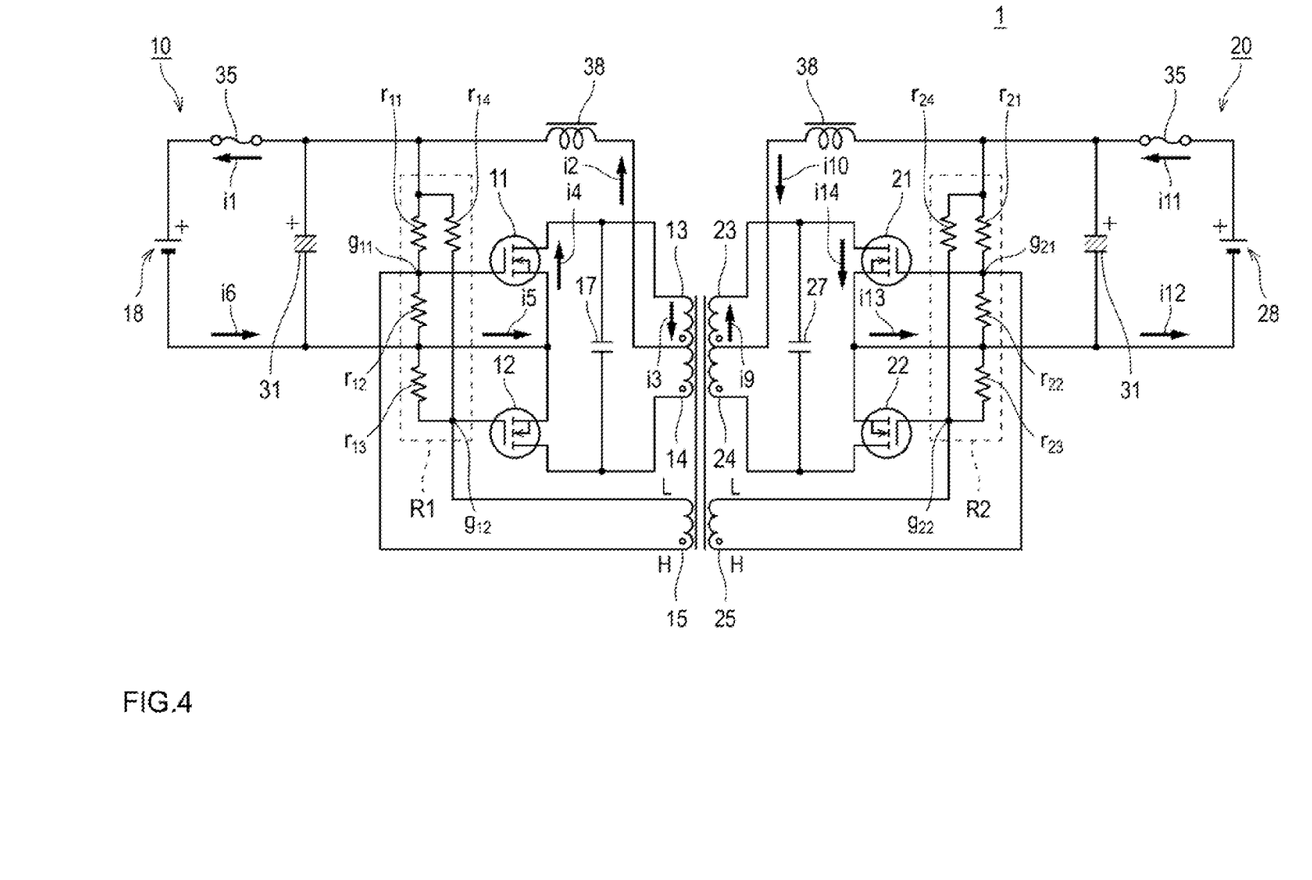
FIG. 4 is a diagram for explaining operations of the power supply system in feeding power from the second circuit to the first circuit.
Figure 5:
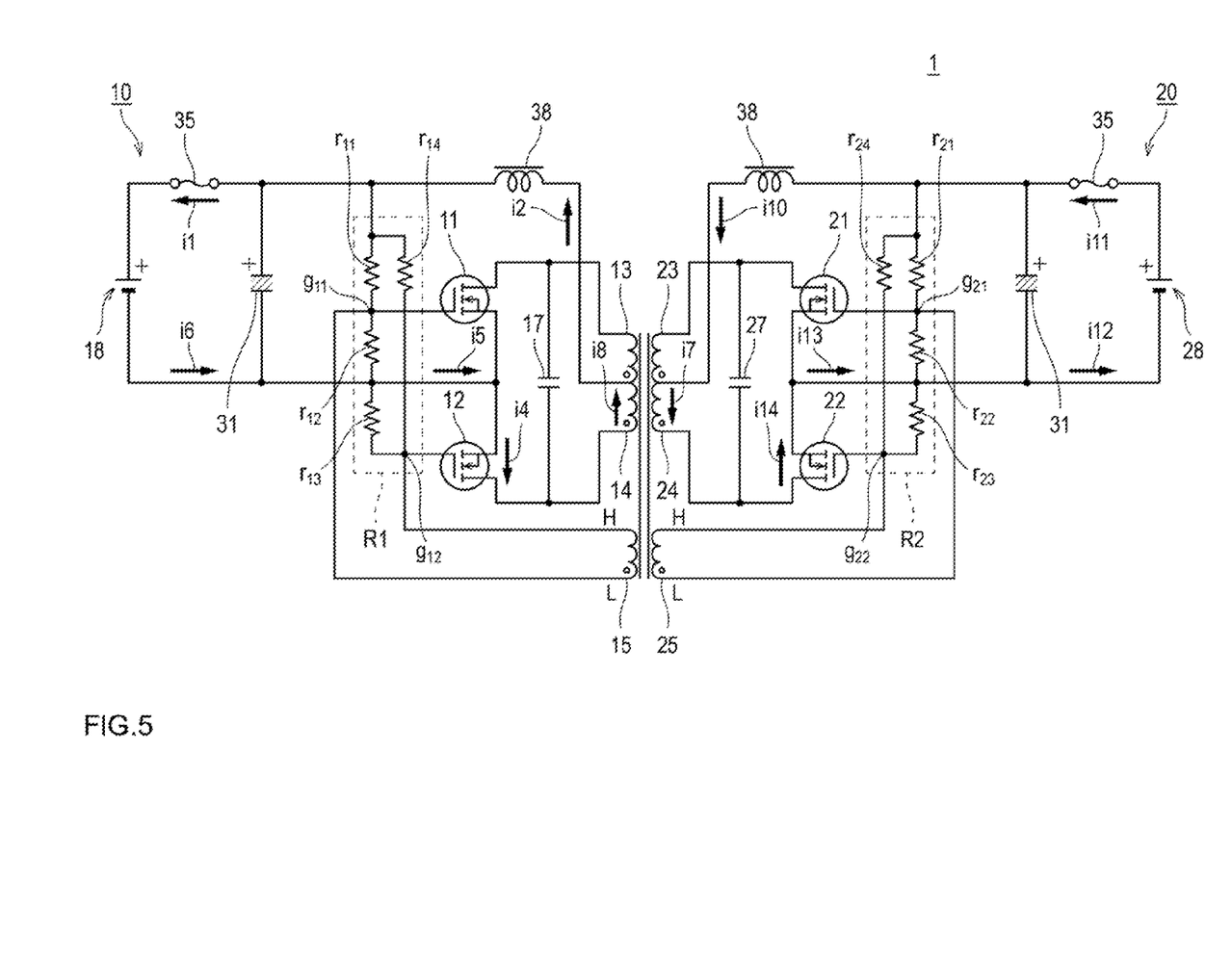
FIG. 5 is a diagram for explaining operations of the power supply system in feeding power from the second circuit to the first circuit.

FIGS. 2 to 5 are diagrams for explaining the operations of the power supply system 1. FIGS. 2 and 3 are diagrams for explaining operations of feeding power from the first circuit 10 to the second circuit 20. In feeding power from the first circuit 10 to the second circuit 20, the power supply system 1 repeats operations illustrated in FIG. 2 and operations illustrated in FIG. 3. FIGS. 4 and 5 are diagrams for explaining operations of feeding power from the second circuit 20 to the first circuit 10. In feeding power from the second circuit 20 to the first circuit 10, the power supply system 1 repeats operations illustrated in FIG. 4 and operations illustrated in FIG. 5.

Power feed from one of the first circuit 10 and the second circuit 20 to the other continues during a period in which the battery device 18 or 28 at a feeding end has a voltage equal to or higher than a predetermined voltage. The battery device 18 or 28 is charged during a period in which the voltage thereof is kept equal to or lower than the predetermined voltage. Meanwhile, the transistor elements 11 and 12 and the transistor elements 21 and 22 keep oscillating until both of voltages of the battery devices 18 and 28 become equal to or lower than the predetermined voltage. Additionally, when both of the battery devices 18 and 28 are at the predetermined voltage, both of the pair of the transistor elements 11 and 12 and the pair of the transistor elements 21 and 22 oscillate. At that time, the first circuit 10 and the second circuit 20 are placed in a so-called open state in which no load is connected thereto.

In a case where a voltage of the battery device 18 is equal to or higher than a predetermined voltage and the battery device 28 is at a voltage equal to or lower than the predetermined voltage, during a charging period of the capacitor 17, a current i1 flows from the battery device 18, passes through the coil 38, and flows into the coil unit 13 as a current i2. Then, a current i3 passes through the coil unit 13. In this case, a potential difference represented by H (High) and L (Low) in FIG. 2 is produced in the driving coil 15 connected to the nodes $g_{11}$ and $g_{12}$ of the resistor group R1. The gate terminal of the transistor element 11 connected to the H side is turned on and the gate terminal of the transistor element 12 connected to the L side is turned off. Thus, a current i4 is fed back to the battery device 18 through the transistor element 11, as currents i5 and i6.

On the other hand, in the second circuit 20, a current i9 in a direction opposite to the current i3 is generated by induced electromotive force generated in the coil unit 23. In the driving coil 25, a potential difference represented by H and L in FIG. 2 is produced by a current flowing through the driving coil 15. The potential difference is applied to the nodes $g_{21}$ and $g_{22}$, so that the gate terminal of the transistor element 21 connected to the H side is turned on and the gate terminal of the transistor element 22 connected to the L side is turned off. Thus, the current i9 is supplied to the battery device 28 as currents i10 and i11 to charge the battery device 28. Currents i12 and i13 flow from the battery device 28 and pass through the transistor element 21 as a current i14.

The capacitor 17 is discharged after completion of the charge. At that time, as illustrated in FIG. 3, the currents i1 and i2 pass through the coil unit 14 as a current i8. Then, the node $g_{12}$ is placed at a high potential and the node $g_{11}$ is placed at a low potential, so that the transistor element 12 is turned on and the transistor element 11 is turned off. The current i4 passes through the transistor element 12 and is fed back to the battery device 18 as the currents i5 and i6.

At that time, in the coil unit 24, a current i7 flows due to induced electromotive force generated by the current i8. Further, a potential difference induced by the driving coil 15 is generated in the driving coil 25, so that the transistor element 22 having its gate electrode connected to the H side is turned on. On the other hand, the transistor element 21 having its gate electrode connected to the L side is turned off. Turning on the transistor element 22 causes the current i7 to pass through the coil unit 24 and flow into the battery device 28 as the currents i10 and i11, to then charge the battery device 28. The current i12 flows from the battery device 28, flows as the current i13, and then passes through the transistor element 22 as the current i14.

Next, there will be described operations of the power supply system 1 in a case where a voltage of the battery device 28 is equal to or higher than a predetermined voltage and the battery device 18 is at a voltage equal to or lower than the predetermined voltage. As illustrated in FIG. 4, during a charging period of the capacitor 27, the current i11 flows from the battery device 28, flows as the current i10, and then passes through the coil unit 23 as the current i9. Then, to turn on the transistor element 21 and turn off the transistor element 22, a potential difference represented by H and L in FIG. 4 is produced in the driving coil 25. In this manner, the transistor element 21 connected to the H side is turned on and the transistor element 22 is turned off. The current i14 passes through the transistor element 21, flows as the current i13, and then is fed back to the battery device 28 as the current i12.

On the other hand, in the first circuit 10, the current i3 in a direction opposite to the current i9 is generated by induced electromotive force generated in the coil unit 13. In the driving coil 15, a potential difference represented by H and L in FIG. 4 is produced by a current flowing through the driving coil 25. The potential difference is applied to the nodes $g_{11}$ and $g_{12}$, so that the transistor element 11 connected to the H side is turned on and the transistor element 12 connected to the L side is turned off. Thus, the current i3 is supplied to the battery device 18 as the currents i2 and i1 to charge the battery device 18. The currents i6 and i5 flow from the battery device 18 and pass through the transistor element 11 as the current i4.

Subsequently, the capacitor 27 is discharged. At that time, as illustrated in FIG. 5, the currents i11 and i10 pass through the coil unit 24 as the current i7. Then, the node $g_{22}$ is placed at a high potential and the node $g_{21}$ is placed at a low potential, so that the transistor element 22 is turned on and the transistor element 21 is turned off. The current i14 passes through the transistor element 22 and is fed back to the battery device 28 as the currents i13 and i12.

At that time, in the coil unit 14, the current i8 flows due to induced electromotive force generated by the current i7. Further, a potential difference induced by the driving coil 25 is generated in the driving coil 15, so that the transistor element 12 connected to the H side is turned on. On the other hand, the transistor element 11 connected to the L side is turned off. Turning on the transistor element 12 causes the current i8 to pass through the coil unit 14 and flow into the battery device 18 as the currents i2 and i1, to then charge the battery device 18. The current i6 flows from the battery device 18, flows as the current i5, and then passes through the transistor element 12 as the current i4.

According to the above-described embodiment, the first circuit 10 and the second circuit 20 are provided and a voltage is supplied from the battery device 18 to the transistor elements 11 and 12 in the first circuit 10, for example. This allows the transistor elements 11 and 12 to oscillate automatically when a voltage of the battery device 18 is equal to or higher than a predetermined voltage. Therefore, there is no need for a component for monitoring a voltage of the battery device 18 to cause oscillation in the embodiment.

Further, in the embodiment, there are provided the coil units 13 and 14 to which a feeding current is supplied from the battery device 18 in an on state of the transistor elements 11 and 12. This allows a feeding current to flow through the coil units 13 and 14 when a voltage of the battery device 18 is equal to or higher than a predetermined voltage in the embodiment. Moreover, in the embodiment, there is provided the driving coil 15 that turns on/off the transistor elements 11 and 12. Turning on/off the transistor elements 11 and 12 changes a feeding current flowing through the coil units 13 and 14. This enables generation of induced electromotive force in the coil units 23 and 24 and the driving coil 25 of the second circuit 20.

Furthermore, according to the embodiment, the transistor elements 11 and 12 are turned on/off depending on a potential difference generated in the driving coil 15. This eliminates a need for a component for externally controlling gate voltages of the transistor elements 11 and 12. A control circuit for a gate voltage, which is a component in addition to the power supply system 1, can be a cause of upsizing, complication, and increase in cost of the power supply system 1. The embodiment, which does not require such control circuit, is advantageous in downsizing, simplification, and reduction in cost of the power supply system 1.

Moreover, according to the embodiment, the battery device 28 is included, so that power generated by induced electromotive force of the coil units 23 and 24 can be stored. This enables bidirectional power feed between the second circuit 20 and the first circuit 10. Further, according to the embodiment, the first circuit 10 and the second circuit 20 can be automatically synchronized with each other with high accuracy by a current. Furthermore, the power supply system 1 of the embodiment, in which each of the first circuit 10 and the second circuit 20 is a current switching element, has a configuration that can easily reduce ripples of an output.

As described above, the embodiment can provide a power supply system and a DC/DC converter that can synchronize a primary circuit and a secondary circuit with high accuracy and are advantageous in downsizing and simplification.

First Modification

Figure 6:
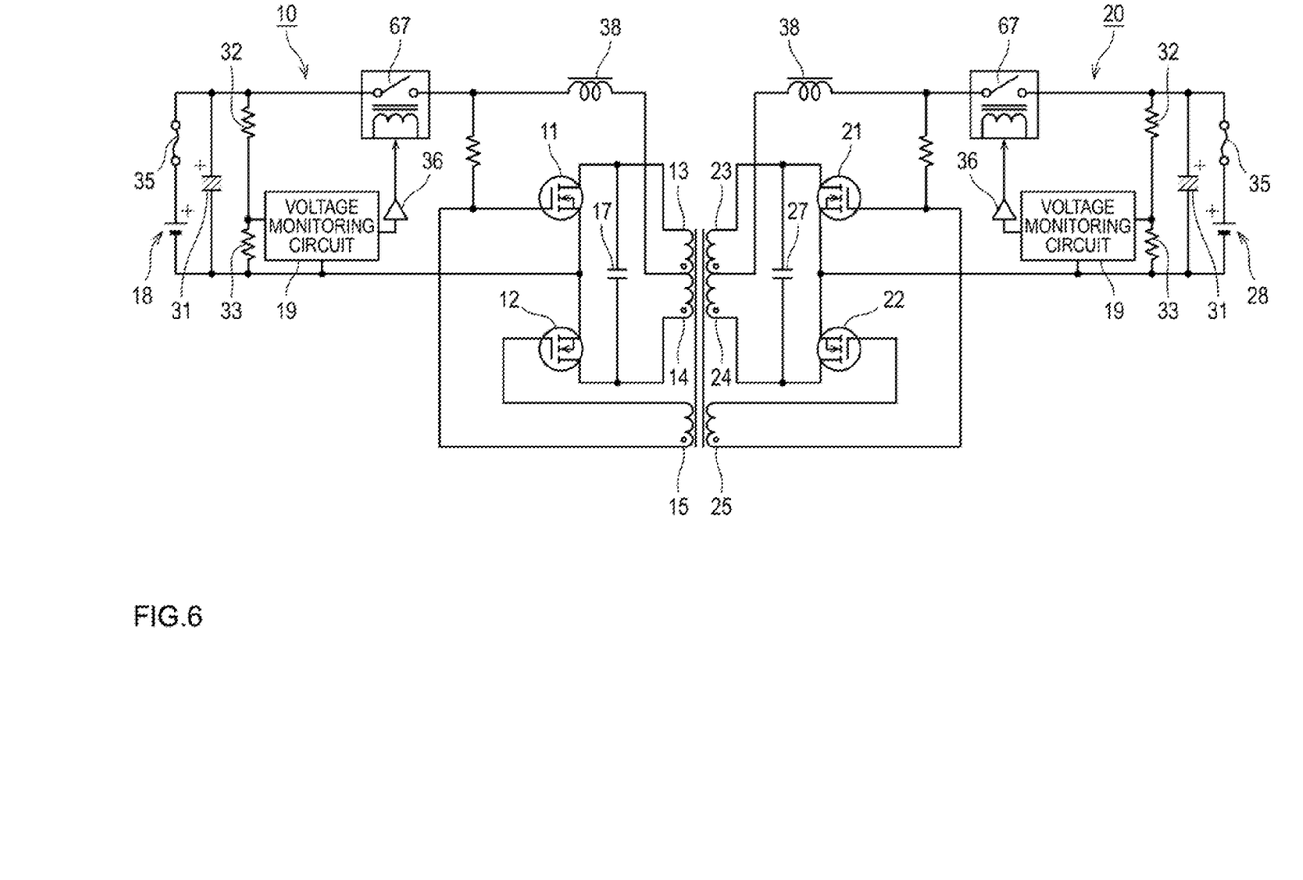
FIG. 6 illustrates a first modification of the power supply system illustrated in FIG. 1.

FIG. 6 illustrates a power supply system 2 in which a relay switch 67 replaces a transistor element to be used for monitoring a voltage in the manner described in the foregoing embodiment. As illustrated in FIGS. 1 and 6, as a component that disconnect the battery devices 18 and 28, any component that can monitor a voltage and disconnect the battery device 18 from the first circuit 10 and the battery device 28 from the second circuit 20 quickly when abnormality occurs in the first circuit 10 or the second circuit 20, can be used. Further, different components may be used in the first circuit 10 and the second circuit 20, respectively. Moreover, the power supply system according to the embodiment is not limited to a configuration in which such component is provided in each of the first circuit 10 and the second circuit 20, and the component may be provided only in one of the circuits that has a risk of abnormality occurrence.

Second Modification

Figure 7:
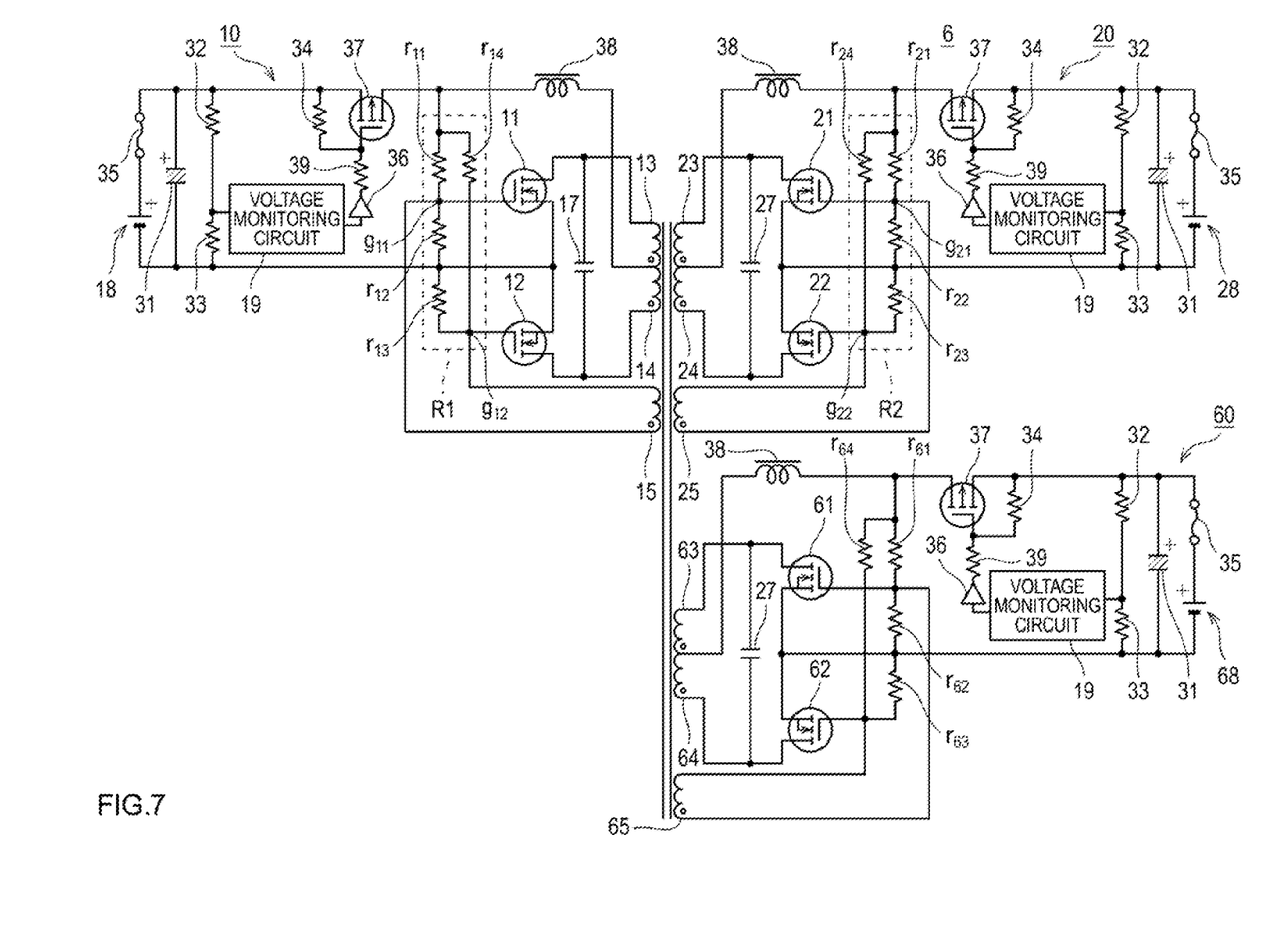
FIG. 7 illustrates a second modification of the power supply system illustrated in FIG. 1.

Further, the power supply system according to the embodiment is not limited to a configuration in which the first circuit 10 and the second circuit 20 are provided in one-to-one correspondence, and a plurality of circuits may be provided on a secondary side. FIG. 7 is a diagram for explaining a power supply system 6 in which two circuits of the second circuit 20 and a third circuit 60 are provided on a secondary side in the power supply system 1 according to the above-described embodiment. The third circuit 60 is configured similarly to the first circuit 10 or the second circuit 20. Specifically, the third circuit 60 includes a battery device 68, resistance elements $r_{61}$ to $r_{64}$, transistor element 61 and 62, the capacitor 27, coil units 63 and 64, and a driving coil 65. Further, the third circuit 60 also includes a component that detects abnormality and disconnects the battery device 68 from the third circuit 60.

The third circuit 60 is caused to operate similarly to the second circuit 20 by the first circuit 10. More specifically, a driving current flows through the driving coil 65 at the time when a feeding current flows through the coil unit 13, so that the transistor element 61 is turned on. Meanwhile, a driving current flows through the driving coil 65 in a direction opposite to the aforementioned driving current at the time when a feeding current flows through the coil unit 14, so that the transistor element 62 is turned on. While the transistor elements 61 and 62 are alternately turned on/off a plurality of times, induced currents generated in the coil units 63 and 64 flow into the battery device 68, so that the battery device 68, together with the battery device 28, is charged.

Further, the third circuit 60 can charge the battery devices 18 and 28 using the battery device 68 in a case where a voltage of the battery device 18 of the first circuit 10 falls below a predetermined voltage. In this second modification, respective voltages of the battery devices 18, 28, and 68 of the first circuit 10, the second circuit 20, and the third circuit 60 may differ from each other. For example, battery devices having 400 V, 48 V, and 12 V can be charged and discharged by each other.

The above-described embodiment includes the following technical ideas.

(1) A power supply system comprises: a first circuit; and a second circuit, wherein the first circuit includes: a first battery device in which power is stored; a first switching element configured to receive supply of a voltage from the first battery device; a first feed coil to which a feeding current is supplied from the first battery device in an on state of the first switching element; a changing element configured to change a flow direction of the feeding current flowing through the first feed coil; and a first driving coil configured to turn on/off the first switching element in accordance with the flow direction of the feeding current, and the second circuit includes: a second feed coil and a second driving coil in which induced electromotive force is generated by the feeding current flowing through the first feed coil; a second switching element configured to be turned on/off by the induced electromotive force generated in the second driving coil; and a load configured to receive supply of power from the second feed coil in an on state of the second switching element.

(2) In the power supply system of (1), the load is a second battery device, and the power supply system further includes a power supply node configured to supply power for the second battery device to a node to which power for turning on the second switching element is supplied.

(3) In the power supply system of (1), in at least the first circuit, the first switching element includes a transistor pair including at least two transistor elements, the first feed coil includes a coil pair including at least two coil units corresponding to the transistor elements, respectively, and the first driving coil turns on/off the transistor elements alternately.

(4) In the power supply system of (3), both ends of the first driving coil are connected to nodes that apply gate voltages to the two transistor elements, respectively.

(5) In the power supply system of (3) or (4), the changing element changes the flow direction in such a manner that the feeding current is supplied alternately to the two coil units included in the coil pair.

(6) In the power supply system of any of (1) to (5), at least the first circuit further includes: a voltage detector configured to detect a voltage value of the first battery device; and a battery disconnecting circuit configured to disconnect the first battery device from the first circuit when the voltage value detected by the voltage detector is higher than a predetermined value.

(7) A bidirectional DC/DC converter comprises: a first circuit; and a second circuit, wherein the first circuit includes: a first direct-current battery device in which power is stored; two first switching elements configured to receive supply of a voltage from the first direct-current battery device; two first feed coils to which a feeding current is supplied from the first direct-current battery device in an on state of the first switching elements; a changing element configured to change a flow direction of the feeding current flowing through the first feed coils; and a first driving coil configured to turn on/off the first switching elements in accordance with the flow direction of the feeding current, and the second circuit includes: two second feed coils and two second driving coils in which induced electromotive force is generated by the feeding current flowing through the first feed coils; two second switching elements configured to be alternately turned on/off by the induced electromotive force generated in the second driving coils, and a second direct-current battery device configured to receive supply of power from the second feed coils in an on state of the second switching elements.

What is claimed is:

1. A power supply system comprising:
   a first circuit; and
   a second circuit,
   wherein the first circuit includes:
   a first battery device in which power is stored;
   a first switching element configured to receive supply of a voltage from the first battery device;
   a first feed coil to which a feeding current is supplied from the first battery device in an on state of the first switching element;
   a changing element configured to change a flow direction of the feeding current flowing through the first feed coil; and
   a first driving coil configured to turn on/off the first switching element in accordance with the flow direction of the feeding current, and
   the second circuit includes:
   a second feed coil and a second driving coil in which induced electromotive force is generated by the feeding current flowing through the first feed coil;
   a second switching element configured to be turned on/off by the induced electromotive force generated in the second driving coil; and
   a load configured to receive supply of power through the second switching element due to the induced electromotive force generated in the second feed coil.

2. The power supply system according to claim 1, wherein the load is a second battery device, and
   the power supply system further includes a power supply node configured to supply power for the second battery device to a node to which power for turning on the second switching element is supplied.

3. The power supply system according to claim 1, wherein in at least the first circuit,
   the first switching element includes a transistor pair including at least two transistor elements,
   the first feed coil includes a coil pair including at least two coil units corresponding to the transistor elements, respectively,
   the two coil units have first ends which form both ends of the first feed coil and the other ends, respectively,
   a coil is provided between the first battery device and the first feed coil and is connected to the other ends of the two coil units, and
   the first driving coil turns on/off the transistor elements alternately.

4. The power supply system according to claim 2, wherein in at least the first circuit,
   the first switching element includes a transistor pair including at least two transistor elements,
   the first feed coil includes a coil pair including at least two coil units corresponding to the transistor elements, respectively,
   the two coil units have first ends which form both ends of the first feed coil and the other ends, respectively,
   a coil is provided between the first battery device and the first feed coil and is connected to the other ends of the two coil units, and
   the first driving coil turns on/off the transistor elements alternately.

5. The power supply system according to claim 3, wherein both ends of the first driving coil are connected to nodes that apply gate voltages to the two transistor elements, respectively.

6. The power supply system according to claim 4, wherein both ends of the first driving coil are connected to nodes that apply gate voltages to the two transistor elements, respectively.

7. The power supply system according to claim 3, wherein the changing element changes the flow direction in such a manner that the feeding current is supplied alternately to the two coil units included in the coil pair.

8. The power supply system according to claim 4, wherein the changing element changes the flow direction in such a manner that the feeding current is supplied alternately to the two coil units included in the coil pair.

9. The power supply system according to claim 1, wherein at least the first circuit further includes:
   a voltage detector configured to detect a voltage value of the first battery device; and
   a battery disconnecting circuit configured to disconnect the first battery device from the first circuit when the voltage value detected by the voltage detector is higher than a predetermined value.

10. A bidirectional DC/DC converter comprising:
   a first circuit connected to a first direct-current battery device in which power is stored; and
   a second circuit connected to a second direct-current battery device in which power is stored,
   wherein the first circuit includes:
      two first switching elements configured to receive supply of a voltage from the first battery device;
      two first feed coils to which a feeding current is supplied from the first direct-current battery device in an on state of the first switching elements;
      a changing element configured to change a flow direction of the feeding current flowing through the first feed coils; and
      a first driving coil configured to turn on/off the first switching elements in accordance with the flow direction of the feeding current,
   the second circuit includes:
      two second feed coils and two second driving coils in which induced electromotive force is generated by the feeding current flowing through the first feed coils; and
      two second switching elements configured to be alternately turned on/off by the induced electromotive force generated in the second driving coils, and
   the second direct-current battery device is able to receive supply of power through the second switching elements due to the induced electromotive force generated in the second feed coil.

* * * * *